Jan. 15, 1952 J. BRAUNWALDER ET AL 2,582,475
FOOD CHOPPER
Filed Feb. 5, 1949 2 SHEETS—SHEET 1
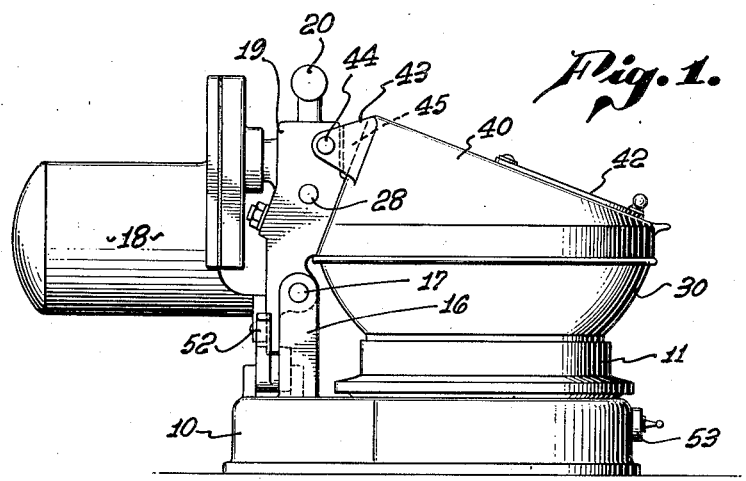
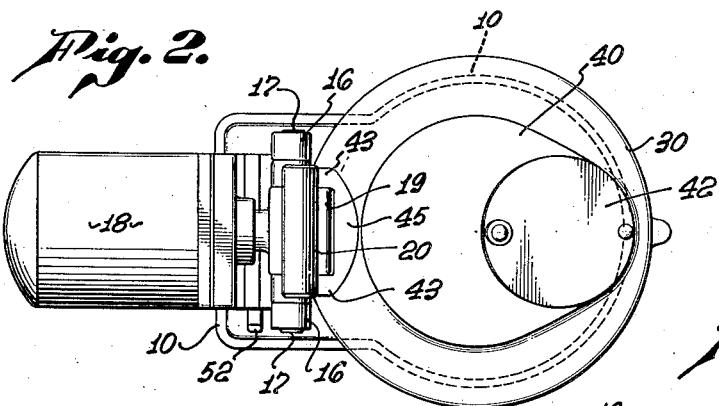
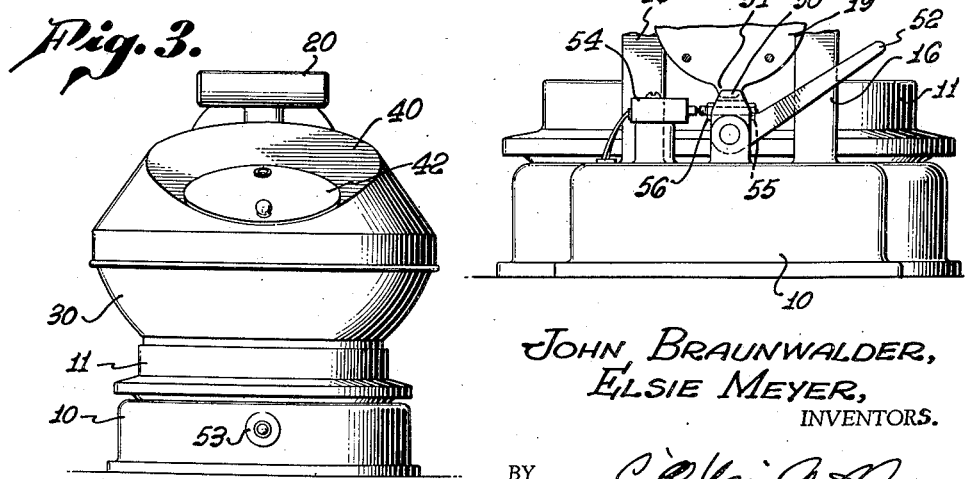
JOHN BRAUNWALDER,
ELSIE MEYER,
INVENTORS.
BY
ATTORNEY.

Jan. 15, 1952
J. BRAUNWALDER ET AL
2,582,475
FOOD CHOPPER
Filed Feb. 5, 1949
2 SHEETS—SHEET 2
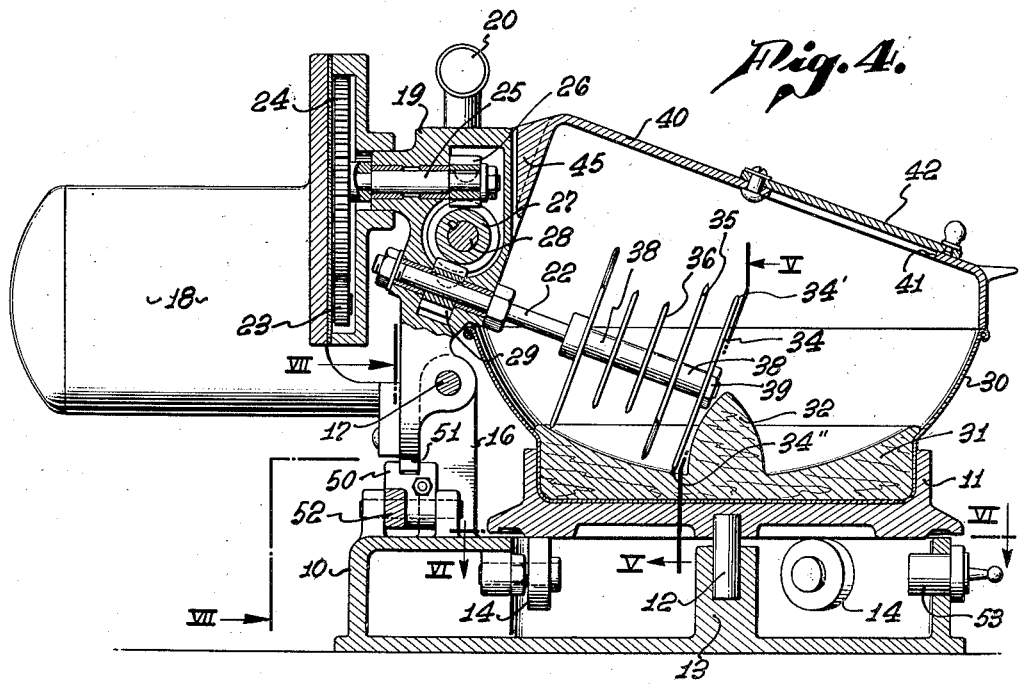
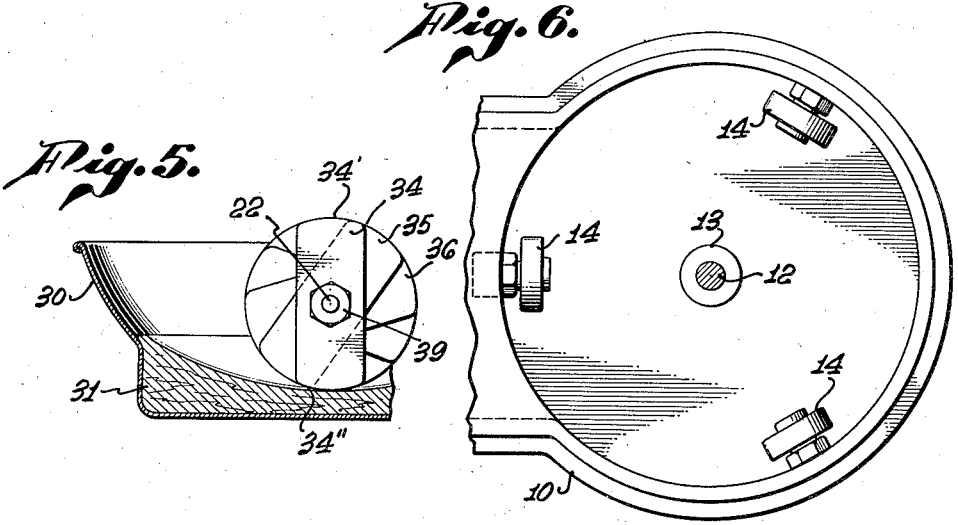
JOHN BRAUNWALDER,
ELSIE MEYER,
INVENTORS.
BY
ATTORNEY.

Patented Jan. 15, 1952

2,582,475

UNITED STATES PATENT OFFICE 2,582,475

FOOD CHOPPER

John Braunwalder, Glendale, and Elsie Meyer, Los Angeles, Calif.; said Braunwalder assignor to said Meyer Application February 5, 1949, Serial No. 74,764

3 Claims. (Cl. 146—67)

This invention relates to an improved household type food chopper and is particularly directed to a food chopping device employing self-cleaning, cutting or chopping elements arranged in such manner as to prevent clogging, the generation of undesirable noise and vibration during use and the prevention of inefficient accumulation of chopped food.

Various foods such as vegetables, fish, meat, etc. require chopping into small pieces in order to permit the production of the completed dish or course; moreover, many people are firmly of the belief that chopping of a food, instead of slicing or grinding thereof, retains wholesome and desirable characteristics therein.

Previous food chopping devices employed heretofore have not been well adapted for household use. Furthermore, prior devices generally included reciprocating parts and elements which generated a great deal of vibration and noise.

The present invention, although applicable to chopping devices for use by restaurants, food packing plants, etc. is particularly well adapted for employment in a household type of food chopper.

Instead of employing reciprocating chopping blades, the present invention employs a series of chopping blades mounted in longitudinally spaced relation along a driven shaft. These chopping blades are angularly related to each other so that during rotation they sequentially come into chopping position. The device is free from reciprocating elements, and by reason of the novel construction hereafter disclosed in detail, a relatively small motor may be employed with greater efficiency. Means are provided for dispersing the food being chopped into the path of the cutting blades; means are provided for preventing the food from being scattered unnecessarily; means are provided for readily charging and discharging the chopping bowl; means are also provided for preventing accidental rotation of the chopping blades when said blades are exposed or tilted out of the chopping position.

It is an object of the present invention, therefore, to disclose and provide a food chopper of novel and efficient characteristics.

A further object of the invention is to disclose a household food chopper including a rotatable bowl, a motor, and a cutter assembly wherein a series of chopping blades is disposed longitudinally along a driven shaft directed towards the axis of rotation of the bowl, the cutter assembly and motor being pivotally mounted in counterbalancing relation so as to facilitate the movement of the blades into and out of the bowl.

A further object of the invention is to disclose and provide a food chopper provided with a series of chopping blades longitudinally spaced along a driven shaft, each of said blades being provided with diametrically opposed chopping edges.

These and various other advantages and novel features of the present invention will be readily understood by those skilled in the art from the following detailed description, reference being had for purposes of example and illustration to the appended drawings herein.

Fig. 1 is a side elevation of a device embodying our invention.

Fig. 2 is a plan view thereof.

Fig. 3 is a front elevation.

Fig. 4 is an enlarged longitudinal section taken in a vertical plane bisecting the device.

Fig. 5 is an end section taken along the plane V—V of Fig. 4.

Fig. 6 is a horizontal section taken along the broken plane VI—VI of Fig. 4.

Fig. 7 is an end elevation taken along the line VII—VII of Fig. 4.

The device illustrated in these drawings comprises a suitable base 10 which is preferably hollow and substantially flat; one end of the base may be somewhat enlarged so as to receive and carry a support 11 upon a pivot pin 12 positioned in a boss 13 formed in the base. The support 11 may be mounted for rotation upon a plurality of idler wheels or rollers such as 14 suitably carried by the base 10.

An upstanding boss 16 provided with a horizontally extending pivot pin 17 supports the motor 18 and a gear housing 19. A handle 20 may be carried by the gear housing. The gear housing encloses a gear drive from the shaft of the motor 18 to a driven shaft 22, both shafts lying in the same vertical plane. The gear train may include the pinion 23 carried on the end of the motor shaft, a large gear 24 carried upon a stub shaft 25, a worm gear 26 mounted upon the shaft 25, a worm 27 mounted upon the transversely extending shaft 28 and a worm gear 29 carried by the driven shaft 22.

The support 11 may be provided with an upstanding lip forming a recess adapted to receive the lower portion of a bowl 30, said bowl being provided with a non-breakable bottom element such as the wooden bottom 31. The center of such bottom 31 may be provided with a centrally located dispersal cone 32. The inner surface of the bottom member 31 may be downwardly and inwardly inclined towards the dispersal cone, the inclination of such bottom surface being substantially the same as the inclination of the driven shaft 22. The shaft 22, when in food chopping position, extends towards the axis of rotation of the support 11 and bowl 30.

A cover 40 provided with a port 41 and auxiliary cover 42 is hingedly connected to the gear housing 19 as by means of lugs 43 and suitable pivot pins 44. Means are provided for limiting the downward movement of the cover 40, such means including a downwardly extending lug 45 between the wing lugs 43 and cooperating with the gear housing 19. It will be evident from the examination of the drawings that the lower margin of the cover 40 can assume a position in close proximity to the upper edge of bowl 30 so as to prevent unnecessary scattering or dispersal of food being chopped, and although the cover 40 is stationary during the chopping operation, it does not interfere with the rotation of the chopping bowl 30 upon the base 10.

The driven shaft 22 is provided with a series of chopping blades such as the blades 34, 35, 36, etc.; each of these blades lies in a plane transverse to the axis of the shaft. Each of these blades is provided with a pair of diametrically opposed chopping edges such as the edges 34' and 34". The length of each chopping edge extends through a radial angle of between 20° and 60°. It will be evident that the chopping edges of a single blade such as the edges 34' and 34" are therefore separated or spaced by greater radial angles than the length of said cutting edges.

The transverse axis of these various blades 34, 35, 36, etc., are angularly displaced with relation to each other so as to sequentially bring chopping edges into food chopping position against the bottom 31 of the chopping bowl. Preferably, the axis of each successive blade is angularly displaced from the axis of a preceding blade, a radial angle substantially equal to the radial angle of a cutting edge. As a result, the various cutting or chopping edges of the blades sequentially come into chopping positions and preferably produce a substantially continuous chopping action thereby eliminating variations in load upon the motor. Moreover, it has been found that clogging of the device is eliminated. Furthermore, by arranging the blades in the indicated manner, said blades will produce repeated sequences of chopping operations which progress outwardly from the central portion of the bowl, thereby preventing the accumulation of excessive quantities of food in the central portion of the bowl.

The number of chopping blades employed may vary appreciably, although it has been found that from three to six blades are sufficient for normal household food choppers. These various chopping blades such as 34—36 may be spaced along the driven shaft 32 by means of intervening tubular spacers, the entire assembly being removably held upon the shaft 22 by means of the end nut 39. The length of the intervening tubular spacers such as 38 may be varied so as to cause the device to chop the food into finer or coarser particles.

Means are also provided for selectively holding the motor, gear housing, shaft, and blades in chopping position. Such means may include a latch in the form of a bell crank lever, the upper end of the lever being slotted as indicated at 50 to receive a downwardly extending lug 51 of the gear housing 19. The opposite end of the lever indicated at 52 is used to either lock or release the motor and housing for pivoted movement about the pivot pin 17. It will be evident that downward movement of arm 52 will disengage the latch and will permit the entire upper assembly including motor, gear housing, driven shaft, cutting blades, and cover 40 to be lifted off the bowl 30. Moreover, it will be noted that the motor 18 counterbalances to some extent the weight of the cover.

Current is normally supplied to the motor 18 through a master switch 53 carried by the hollow base 10. In order to prevent accidental rotation of the chopping blades when they are in a raised position, means are provided to interrupt the circuit to the motor when the upper assembly is tilted. A safety switch such as the microswitch 54 is interposed in the circuit between the master switch 53 and the motor 18. This switch 54 is closed by a finger 55 adjustably positioned on the bell crank lever 50. The finger 55 may be a stud bolt held by the bell crank lever and held in a desired position by means of the nut 56. The finger is adjusted so as to close the switch 54 when the latching means firmly holds the lug 51 of the gear housing 19.

From the description given hereinabove, it will be noted that the entire food chopper is compact, easily carried from place to place by means of the handle 20, readily filled with food to be chopped by raising the cover 40, and is provided with means whereby accidental rotation of the chopping blades is prevented by the cover 40, unless the chopping blades are in chopping position. Although in the description given hereinabove, repeated reference has been made to the chopping action of the blades, it will be understood that by the term "chopping" reference is also made to the shearing and slicing action of the blades as they approach the bottom of the chopping bowl. Since the blades do not reciprocate vertically or in a plane perpendicular to the surface against which they eventually act, a shearing action or slicing action is obtained and this appears to be a highly desirable characteristic of the present device. Furthermore, although particular attention has been drawn to the fact that the outer edges or chopping edges, such as 34' and 34", are the ultimately effective portions of the chopping blades, the intervening portions or those parallel edges which connect the chopping edges 34' and 34" may also be sharpened so as to facilitate and expedite the slicing and chopping action.

Those skilled in the art will readily appreciate that numerous changes and variations can be made from the specific description given herein. The gear drive between the motor and the driven shaft 22 may assume various forms. The means for electrically locking the chopper in operating position may also vary.

All changes and modifications coming within the scope of the appended claims are embraced thereby.

We claim:

1. In a household food chopper the provision of: a hollow base; a removable bowl rotatably mounted upon the base about a vertical axis of rotation and provided with a concave bottom; an upstanding boss at one end of the base; a motor and associated gear housing hinge-connected to the boss for movement upon a horizontal axis to one side of said bowl; a cutter assembly including a driven cutter shaft extending from the gear housing with its axis downwardly inclined in a vertical plane passing through a radius of the bowl, a series of flat elongated chopping blades longitudinally spaced along the driven shaft and carried thereby in spaced parallel planes inclined to the axis of the bowl, each of said blades being of uniform width and provided with diametrically opposed circumferentially spaced curved chopping end edges, the blades of said series being angularly displaced with relation to each other to sequentially come into food chopping position and into proximity with the bottom of the bowl; said motor extending from the housing in a direction opposed to the cutter assembly and tending to counter-balance said cutter assembly; and a releasable latch means carried by the base adjacent said boss for releasably holding the motor, gear housing, shaft and blades in chopping position.

2. A household food chopper comprising: a hollow base; a bowl provided with an inwardly and downwardly inclined bottom removably carried upon the base and rotatable about a vertical axis; an upstanding boss at one end of the base; a motor and associated gear housing hinge-connected to the boss for movement upon a horizontal axis to one side of said bowl; a cutter assembly including a driven cutter shaft extending from the gear housing with its axis downwardly inclined and a series of flat chopping blades longitudinally spaced along the driven shaft and carried thereby in planes perpendicular to the axis of the cutter shaft and inclined to the axis of rotation of the bowl, each of said blades being of uniform width and provided with diametrically opposed circumferentially spaced curved chopping end edges, the blades of said series being angularly displaced with relation to each other to sequentially come into food chopping position and in proximity with the bottom of the bowl; the motor extending from the housing in a direction opposed to the cutter assembly with the motor axis in the same vertical plane as the driven cutter shaft axis and the axis of rotation of the bowl, said motor tending to counter-balance said cutter assembly; and a releasable latch means carried by the base adjacent said boss for releasably holding the motor, gear housing, shaft and blades in chopping position.

3. A food chopper of the character stated in claim 2 including a cover member positioned above the chopping blades and bowl and connected to the gear housing and cutter assembly for movement therewith, the axis of each successive blade of said chopping blades being angularly displaced along the driven cutter shaft a radial angle substantially equal to the angle included by the curved cutting edge.

JOHN BRAUNWALDER.
ELSIE MEYER.

REFERENCES CITED

The following references are of record in the file of this patent:

UNITED STATES PATENTS

| Number | Name | Date |
|---|---|---|
| 1,029,141 | Nielsen | June 11, 1912 |
| 1,488,250 | Hottmann | Mar. 25, 1924 |
| 1,512,484 | Porter | Oct. 21, 1924 |
| 1,724,598 | Johnston | Aug. 13, 1929 |
| 1,929,864 | Aeschbach | Oct. 10, 1933 |
| 2,245,012 | Robinson | June 10, 1941 |

FOREIGN PATENTS

| Number | Country | Date |
|---|---|---|
| 689 | Switzerland | Mar. 5, 1880 |
| 5,660 | Great Britain | Mar. 13, 1908 |
| 203,234 | Germany | Oct. 16, 1908 |